United States Patent [19]

Williams, III et al.

[11] 4,297,474

[45] Oct. 27, 1981

[54] POLYETHERIMIDES PREPARED BY SELF-CONDENSATION OF HYDROXYARYL PHTHALIMIDE SALTS

[75] Inventors: Frank J. Williams, III, Scotia; Howard M. Relles, Rexford, both of N.Y.

[73] Assignee: General Electric Company, Schenectady, N.Y.

[21] Appl. No.: 125,796

[22] Filed: Feb. 29, 1980

[51] Int. Cl.³ .............................................. C08G 73/10
[52] U.S. Cl. .................................................... 528/170
[58] Field of Search ........................................ 528/170

[56] References Cited

U.S. PATENT DOCUMENTS

| | | | |
|---|---|---|---|
| 3,787,364 | 1/1974 | Wirth et al. | 528/170 |
| 3,821,164 | 6/1974 | Relles et al. | 528/170 |
| 3,838,097 | 9/1974 | Wirth et al. | 260/30.2 |
| 3,852,242 | 12/1974 | White | 528/170 |
| 4,024,110 | 5/1977 | Takekoshi | 528/170 |

OTHER PUBLICATIONS

Caswell et al., *J. Heterocyclic Chem.*, vol. 3, 1966, pp. 333-335.
Fowler et al., *J. Heterocyclic Chem.*, vol. 10, 1973, pp. 107-108.

*Primary Examiner*—Maurice J. Welsh
*Attorney, Agent, or Firm*—William A. Teoli; James C. Davis, Jr.

[57] ABSTRACT

Polyetherimides are provided which are based on the self-condensation in a dipolar aprotic solvent of a hydroxyaryl phthalimide salt having a nuclear bound leaving radical on the phthalimide ring. The polyetherimides are injection-moldable high performance thermoplastics.

7 Claims, No Drawings

POLYETHERIMIDES PREPARED BY SELF-CONDENSATION OF HYDROXYARYL PHTHALIMIDE SALTS

BACKGROUND OF THE INVENTION

Prior to the present invention, as shown by Wirth et al U.S. Pat. No. 3,838,097, assigned to the same assignee as the present invention, polyetherimides were prepared by effecting reaction between an alkali metal bisphenoxide and a bis(nitrophthalimide) in the presence of a dipolar aprotic solvent. Valuable results were achieved by the practice of the aforementioned method of Wirth et al resulting in the production of a variety of useful polyetherimides which could be employed in different applications. The present invention is based on the discovery that unlike the method of Wirth et al, based on the intercondensation of difunctional reactants, polyetherimides also can be made by the self-condensation of a hydroxyaryl phthalimide salt having a nuclear bound leaving radical on the phthalimide ring. The polyetherimides of the present invention have been found to be useful high performance thermoplastics.

The polyetherimides of the present invention comprise chemically combined units of the formula,

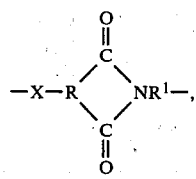
(1)

where R is a trivalent $C_{(6-13)}$ aromatic organic radical, $R^1$ is a divalent $C_{(6-30)}$ aromatic organic radical and X is selected from —O—, or —S—.

Radicals included within R of formula (1), are for example,

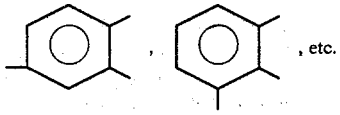
, etc.

Radicals included within $R^1$ of formula (1), are for example,

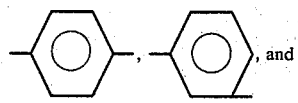
, and

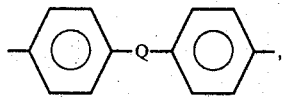
, where Q is a member selected from the class consisting of —O—,

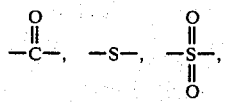

and $C_xH_{2x}$, where x is an integer equal to 1 to 5 inclusive.

There is also provided by the present invention, a method for making polyetherimide which comprises, (A) heating a mixture comprising a phthalimide salt of the formula,

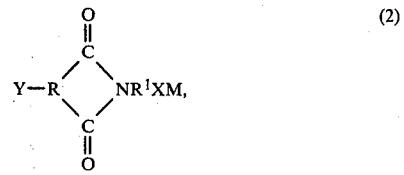
(2)

and a dipolar aprotic solvent, (B) allowing the mixture to cool to ambient temperatures and (C) effecting the precipitation of polyetherimide from the mixture of (B), where Y is a nuclear bound leaving group selected from the class consisting of chloro, fluoro and nitro, M is an alkali metal ion or ammonium salt and R and $R^1$ are as previously defined.

The phthalimide salts of formula (2) can be made by heating a mixture of a nonpolar solvent and an alkoxide base or amine and a hydroxy aryl phthalimide of the formula,

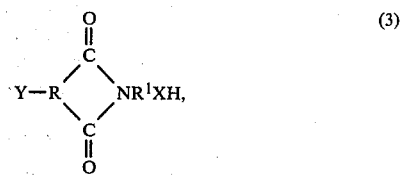
(3)

where R, $R^1$, X, and Y are as previously defined.

There are included within the hydroxyaryl phthalimides of formula (3) compounds such as

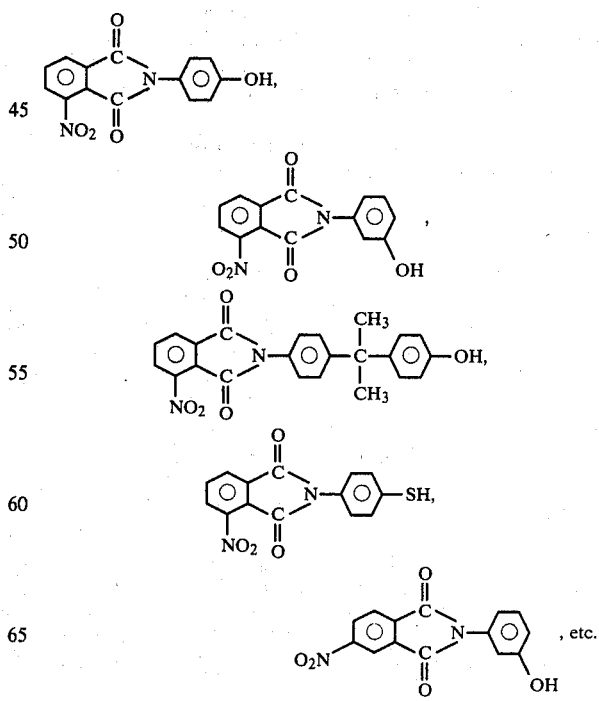

The polyetherimides of the present invention can be employed to make films, coatings, etc., can be used as an injection moldable plastic to produce a variety of tough molded parts, etc. The polyetherimides consisting essentially of chemically combined units of formula (1) can be reinforced with various particulated fillers such as glass fibers, silica fillers, carbon whiskers, to up to 50% by weight of the resulting total blend. Reinforcement of the polymer can be accomplished prior to polymer formulation by effecting polymerization in the presence of filler, melt blending and solution blending also can be used.

In the practice of the invention the phthalimide salt of formula (2) can be self-condensed in a dipolar aprotic solvent such as N-methylpyrrolidone, dimethylformamide, dimethylacetamide, etc. The phthalimide salt can be made by effecting reaction between substantially equal molar amounts of a hydroxyaryl phthalimide of formula (3) and an alkali metal alkoxide, such as anhydrous sodium methoxide, potassium t-butoxide, or amines as triethylamine, etc. In order to facilitate salt formation there can be used a nonpolar solvent to minimize the attack of the phthalimide ring with the alkoxide ion. Suitable nonpolar solvents which can be used to facilitate the production of the phthalimide salt are, for example, benzene, toluene, hexane, etc. After salt formation which can be achieved by heating nonpolar solvent alkali alkoxide and hydroxy aryl phthalimide of formula (3) mixture at a temperature in the range of from 25° C. to 125° C. Prior to the addition of the dipolar aprotic solvent, the nonpolar solvent can be stripped from the mixture if desired, or it can be left in the mixture during the self-condensation reaction.

The self condensation of the phthalimide salt of formula (2) can be effected in the presence of a dipolar aprotic solvent as previously defined. After the polymerization the resulting polyetherimide can be recovered from the polymerization mixture by the use of a precipitating solvent such as methanol, hexane, water, etc. The polymerization mixture, for example, can be allowed to cool to ambient temperatures and thereafter poured into excess methanol. The resulting precipitated product can then be filtered or recovered by other conventional means such as centrifuging, etc.

The hydroxyarylphthalimides of formula (3) can be made by effecting reaction between substantially equal molar amounts of a substituted phthalic anhydride of the formula,

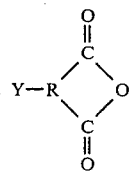  (4)

and a hydroxyaryl amine of the formula,

NH$_2$R$^1$XH,  (5)

where R, R$^1$, Y and X are as previously defined. Reaction can be facilitated in the presence of an organic solvent, such as acetic acid.

In order that those skilled in the art will be better able to practice the invention, the following examples are given by way of illustration and not by way of limitation. All parts are by weight.

EXAMPLE 1

A mixture of 26 parts of 3-nitro phthalic anhydride, 14.7 parts of meta amino phenol and 425 parts of glacial acetic acid was heated at reflux under a nitrogen atmosphere. After heating for 16 hours, the resulting homogenous solution was cooled to room temperature and the resulting precipitate was filtered and dried to give 31.8 parts of the desired product. Further concentration of the filtrate resulted in a total yield of 95%. Based on method of preparation the product was 3-nitro-N-(3'-hydroxy)phenylphthalimide. The crude product was recrystallized from absolute ethanol to give a material having a melting point of 200°–201.5° C. The identity of the product was further confirmed by $^{13}$C nmr and infrared spectroscopy.

Additional hydroxyarylphthalimides were prepared following the same procedure using additional nitrophthalic anhydrides or hydroxyarylamines as shown as follows:

| Phthalic Anhydride | hydroxyarylamine | M.P. |
| --- | --- | --- |
| 3-nitro-phthalic anhydride | p-aminophenol | 206–208° C. |
| 4-nitro-phthalic anhydride | m-aminophenol | 213–214° C. |
| 3-nitro-phthalic anhydride | 2-(p-aminophenyl)-2-(p-hydroxyphenyl)propane | 172–176° C. |
| 3-nitro-phthalic anhydride | p-aminothiophenol | 182–186° C. |

EXAMPLE 2

A mixture of 0.843 part of anhydrous sodium methoxide, 4.43 parts of 3-nitro-N-(3'-hydroxy)phenylphthalimide and about 27 parts of benzene was stirred under a nitrogen atmosphere at room temperature. A light tan, heterogeneous mixture was obtained after 1½ hours of stirring. There was added to the mixture about 35 parts of anhydrous DMF and the mixture almost immediately formed a homogenous dark red solution. The mixture was then heated at 80° C. for 3½ hours resulting in the production of a precipitate. The mixture was then allowed to cool to room temperature and poured into methanol. The resulting product was then collected, dried and dissolved in hot dimethylformamide. It was then reprecipitated in methanol and dried resulting in 85% yield of product. Based on method of preparation and IR analysis and $^{13}$C nmr analysis the product was a polyetherimide consisting essentially of chemically combined units of the formula,

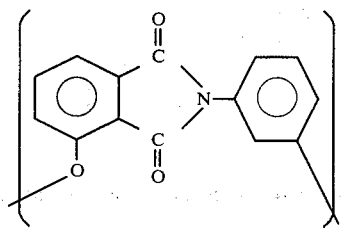

The above polymer was found to have an IV in meta-cresol of 0.12 and a GPC(CHCl$_3$) (Mw/Mn)=1.56. The polyetherimide is dissolved in dimethylformamide and then the solution poured onto a glass plate resulting in a tough film upon evaporation of solvent. Additional polyetherimide is placed in a 1 inch square × ⅛ inch mold and heated to a temperature of 280° C. at a pressure of 5000 psi. There is obtained a tough molded 1 inch × 1 inch × ¼ inch part.

EXAMPLE 3

A mixture of 0.7831 part of anhydrous sodium methoxide, 5.8342 parts of 3-nitro-N-(4'-p-hydroxycumyl)-phenylphthalimide, and about 27 parts of benzene was stirred at room temperature under a nitrogen atmosphere. After stirring for 3 hours the solution was warmed to 60° C. and a vacuum was applied to remove the benzene. The resulting salt was then stirred with about 36 parts of anhydrous dimethylformamide and the resulting red, homogenous solution was heated at 80° C. for 3½ hours. The mixture was then allowed to cool to room temperature and poured into methanol. The resulting precipitate was recovered and then dissolved in chloroform and the chloroform solution was filtered. The filtrate was then poured into additional methanol. The product was then collected by filtration resulting in an 89% yield. Based on method of preparation the product was a polyetherimide consisting essentially of chemically combined units of the formula,

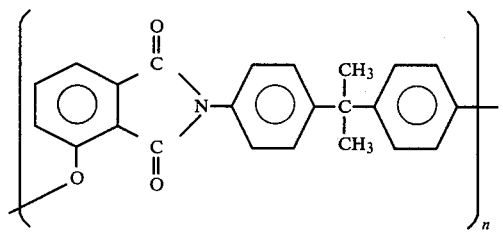

The identity of the product was further confirmed by its IR spectra and $^{13}$C nmr analysis. The polymer had an IV in chloroform of 0.13 and the GPC(CHCl$_3$) showed a 1.76 ratio for $M_w/M_n$.

The polyetherimide is found to possess substantially the same film forming and moldable properties as shown for the polymer of Example 2.

Although the above examples are directed to only a few of the very many variables involved with the compositions and methods of the present invention, it should be understood that the present invention is directed to a much broader variety of polyetherimides as shown by polymers comprising chemically combined units of formula (1) which can be made by the self-condensation of phthalimide salts of formula (2).

What I claim as new and desire to secure by Letters Patent of the United States is:

1. Polyetherimides comprising chemically combined units of the formula,

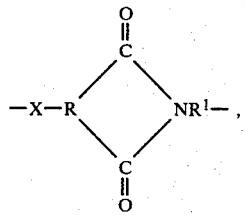

where R is a trivalent C$_{(6-13)}$ aromatic organic radical, R$^1$ is a divalent C$_{(6-30)}$ aromatic organic radical and X is selected from —O—, or —S—.

2. A polyetherimide in accordance with claim 1, where R is

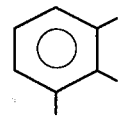

3. A polyetherimide in accordance with claim 1, where R is

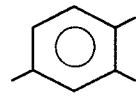

4. A polyetherimide in accordance with claim 1, where R$^1$ is

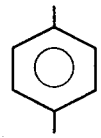

5. A polyetherimide in accordance with claim 1, where R$^1$ is

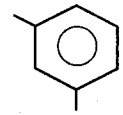

6. A polyetherimide in accordance with claim 1, where R$^1$ is

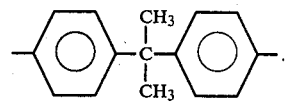

7. A method for making polyetherimide which comprises
(1) heating a mixture comprising a phthalimide salt of the formula,

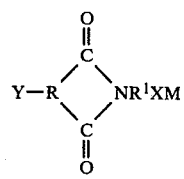

in a dipolar aprotic solvent,
(2) allowing the mixture of (1) to cool to ambient temperatures and
(3) effecting the precipitation of polyetherimide from the mixture of (2), where R is a trivalent C$_{(6-30)}$ aromatic organic radical, R$^1$ is a divalent C$_{(6-30)}$ aromatic organic radical, X is selected from —O—, or —S—, and M is an alkali metal ion or an ammonium salt.

* * * * *

UNITED STATES PATENT AND TRADEMARK OFFICE
CERTIFICATE OF CORRECTION

PATENT NO. : 4,297,474

DATED : October 27, 1981

INVENTOR(S) : Frank J. Williams, III and Howard M. Relles

It is certified that error appears in the above—identified patent and that said Letters Patent is hereby corrected as shown below:

Column 6, line 67, cancel "salt" and substitute -ion-

Column 6, line 67, after "ion" insert -and Y is a nuclear bound leaving group selected from the class consisting of chloro, fluoro and nitro- Signed and Sealed this Twenty-third Day of February 1982

[SEAL]

Attest:

GERALD J. MOSSINGHOFF

*Attesting Officer*  Commissioner of Patents and Trademarks